(12) United States Patent
Buchko, Jr. et al.

(10) Patent No.: US 11,999,520 B2
(45) Date of Patent: Jun. 4, 2024

(54) SYSTEM FOR AUTOMATIC CALIBRATION OF AN INITIAL POSITION OF A MOVEABLE MACHINE COMPONENT

(71) Applicant: CP Packaging, LLC, Appleton, WI (US)

(72) Inventors: Raymond G. Buchko, Jr., Fremont, WI (US); Rodney W. Golla, New London, WI (US)

(73) Assignee: CP Packaging, LLC, Appleton, WI (US)

( * ) Notice: Subject to any disclaimer, the term of this patent is extended or adjusted under 35 U.S.C. 154(b) by 192 days.

(21) Appl. No.: 17/669,508

(22) Filed: Feb. 11, 2022

(65) Prior Publication Data

US 2023/0257150 A1 Aug. 17, 2023

(51) Int. Cl.
*B65B 57/00* (2006.01)
*B65B 47/06* (2006.01)
(Continued)

(52) U.S. Cl.
CPC ............ *B65B 57/005* (2013.01); *B65B 47/06* (2013.01); *B65B 57/16* (2013.01); *G05B 19/401* (2013.01)

(58) Field of Classification Search
CPC ....... B65B 57/005; B65B 47/06; B65B 57/16; H02P 8/00; H02P 8/005; H02P 8/02; H02P 8/04; H02P 8/14; H02P 8/22; H02P 8/24; H02P 8/34; H02P 6/00; H02P 6/08; H02P 6/06; H02P 6/16; H02P 6/24; H02P 1/26;
(Continued)

(56) References Cited

U.S. PATENT DOCUMENTS 7,145,309 B2 * 12/2006 Reiter ...................... H02P 8/24
318/696
7,833,002 B2 11/2010 Buchko, Jr. et al.
(Continued)

FOREIGN PATENT DOCUMENTS

CN 113593040 11/2021

OTHER PUBLICATIONS

International Search Report and Written Opinion of International Searching Authority dated May 2, 2023 in International (PCT) Application No. PCT/US23/61064.

*Primary Examiner* — Antony M Paul
(74) *Attorney, Agent, or Firm* — Crowell & Moring LLP

(57) ABSTRACT

A system is provided that can automatically calibrate or define a home or initial position of a moveable component of an industrial machine. During the calibration procedure, an actuator may be operated in a low speed and/or low torque mode to drive the component until the component contacts a mechanical stop. This provides a hard-stop of the component's movement while the actuator attempts to further drive the component, which creates a stall condition of the actuator. A control system monitors that actuator's performance characteristics and is configured to identify an anomalous performance characteristic(s) value that corresponds to the actuator's stall condition as a triggering event. When the control system identifies the triggering event, it defines the component's position as a null point and determines a zero point to define an initial operational position of the component as a function of the null point.

17 Claims, 7 Drawing Sheets

(51) Int. Cl.
*B65B 57/16* (2006.01)
*G05B 19/401* (2006.01)

(58) Field of Classification Search
CPC .... H02P 1/42; H02P 1/04; H02P 21/32; H02P 2203/03; H02P 21/18; H02P 21/34; H02P 25/089

See application file for complete search history.

(56) References Cited

U.S. PATENT DOCUMENTS

| | | |
|---|---|---|
| 7,934,362 B2 | 5/2011 | Buchko, Jr. et al. |
| 10,961,093 B2 | 3/2021 | Buchko, Jr. et al. |
| 2013/0178980 A1 | 7/2013 | Chemouny et al. |
| 2017/0365501 A1 | 12/2017 | Ng et al. |
| 2021/0011475 A1 | 1/2021 | Haputhanthri et al. |

\* cited by examiner

SYSTEM FOR AUTOMATIC CALIBRATION OF AN INITIAL POSITION OF A MOVEABLE MACHINE COMPONENT

FIELD OF THE INVENTION

This invention relates generally to packaging or other industrial machines and, more particularly, to a system that can automatically calibrate an initial position for a moveable machine component.

BACKGROUND OF THE INVENTION

Packing machines and other industrial machines typically have numerous actuators as parts of motion control systems that are used to move various machine components to perform the machines' tasks. To increase productivity, efforts have been made to increase machine operational speed(s). Options for improving machine operational speed tend to relate to improvements in actuators, which may have motors or other prime movers that, themselves, have faster operational speeds.

Along with increased actuator speeds to increase productivity, efforts have also been made to improve the accuracy of machine component movement(s). Increasing a machine's accuracy often includes incorporating additional sensors or more sophisticated sensors into the machine to either monitor component or object movement(s) and/or as set up devices to facilitate initial calibration of various machine components. However, incorporating additional and/or more sophisticated sensors into an industrial machine increases its cost and complexity.

SUMMARY OF THE INVENTION

The present invention is directed to a system that can automatically and repeatably perform a calibration procedure(s) in an industrial machine during a machine calibration session, without relying on an auxiliary sensor(s). With fewer sensors, the industrial machine may correspondingly have a simpler overall design and control strategy and also fewer surfaces that are susceptible to accumulating debris.

According to one aspect of the invention, the system may use motor feedback of an actuator's drive motor to identify a triggering event that can be used to define a home or initial position of a machine component for use in its operational routine.

According to another aspect of the invention, during a calibration session, the system may monitor the actuator drive motor's performance characteristics while it drives a moveable machine component. The system is configured to identify a triggering event while monitoring the actuator drive motor's performance characteristics. The triggering event may correspond to an anomalous performance characteristic value, such as a substantial torque rise that is defined by a generally step-change type increase in the actuator drive motor's torque value. A mechanical stop, which may be a pin or the like, may be arranged within a travel path of a moveable machine component to provide a rigid stop point or obstruction. During the calibration session, the actuator purposely drives the moveable machine component into the stop to initiate the torque rise at the moment of impact and thus the triggering event. At the triggering event, the system may define a null point to correspond to the moveable machine component's position at that time. Based on the position of the null point, the system defines a zero point that corresponds to an initial position of the moveable machine component that serves as a start position from which the moveable machine component moves to begin its operational routine during a machine use session.

According to another aspect of the invention, the system may perform the calibration session with the actuator in a calibration mode. In the calibration mode, the actuator drive motor's performance may be limited to a reduce torque value and/or a reduced speed value.

According to another aspect of the invention, during the calibration session, the system commands the actuator to move the moveable machine component through its operational range, but at the reduced torque value and/or speed value as a confirmation movement path. The system may continue to monitor the actuator's performance characteristic(s) while moving the moveable machine component through the confirmation movement path. Any anomalous performance characteristics may define a fault condition(s), which may correspond to unintended obstructions of the movement that may indicate misalignment of various components within a subsystem or station in which the calibration is being performed, or other problems that could compromise the operational routine.

According to another aspect of the invention, the calibration procedure may include a reference position seeking phase, an initial operational position seeking phase, and an operational routine confirmation phase. During the reference position seeking phase, the actuator continuously drives the component until the component collides with the stop. At the moment of impact, the actuator stalls and values of its performance characteristics substantially change during a short period of time, such as step-change type torque increases and speed decreases, which the system detects as anomalous values or triggering events. During the initial operational position seeking phase, the control system commands the actuator to drive the component from the null point or stop engagement position to a zero point or proposed or assumed initial position. During the operational routine confirmation phase, the control system commands the actuator to drive the component through a movement path that is the same as a movement path that is performed during the machine use session.

According to another aspect of the invention, the control system may compare monitored torque information or confirmation phase torque values to values of reference torque curves to evaluate the acceptability of the component's movement(s). If the component's movement(s) during the confirmation phase is acceptable, then the control system commits or sets the assumed initial position to a calibrated initial position for use as the component's starting point during the machine use session.

Figure 1:
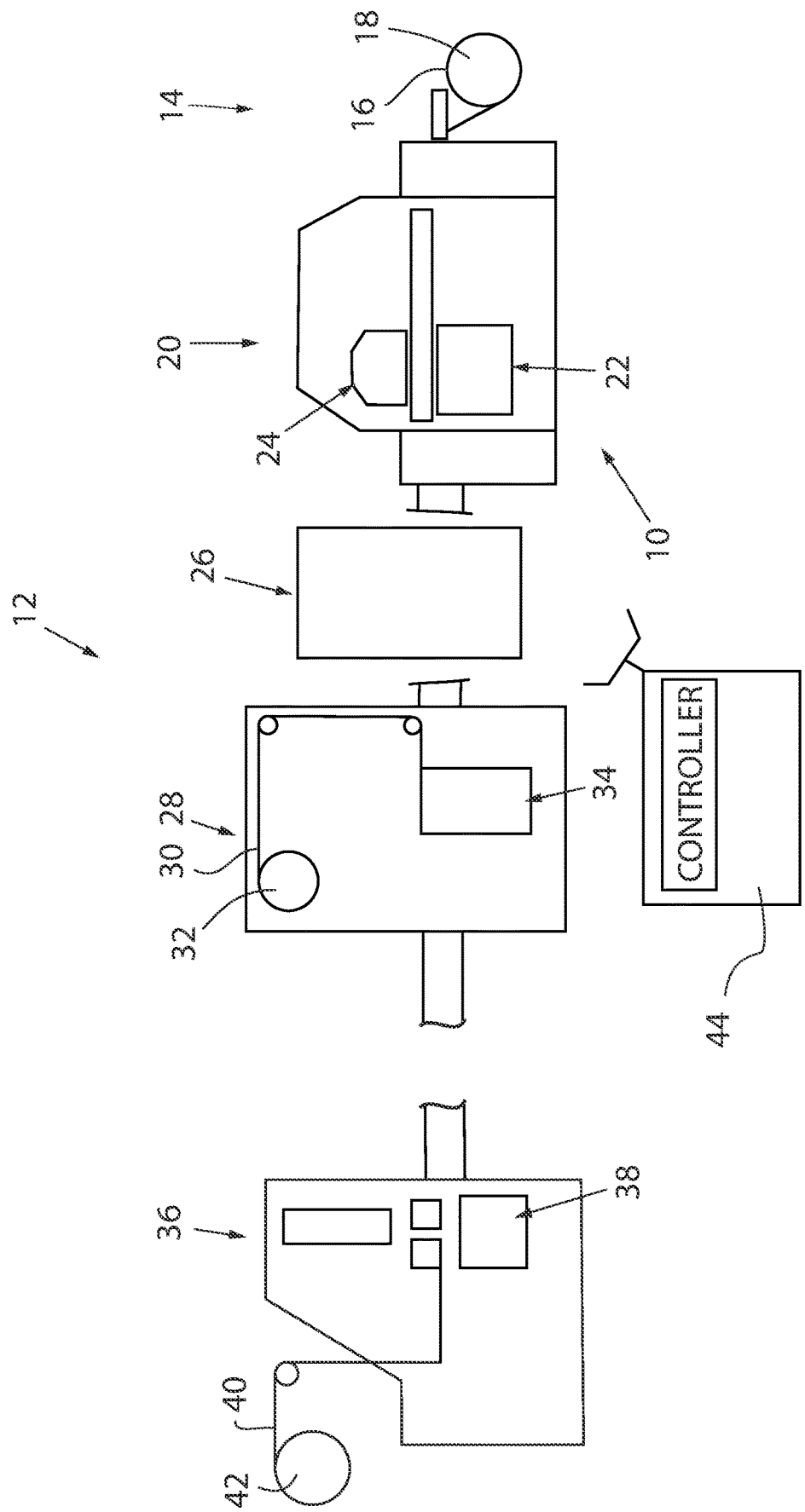
FIG. 1 is a schematic representation of an industrial machine implementing a system for automatic calibration of an initial position of a moveable machine component of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a system for automatic calibration of an initial position of a moveable machine component of an industrial machine is represented as system 10. System 10 is typically configured to perform the automatic calibration as a function of an identified anomalous performance characteristic value(s) of an actuator, which may do so without requiring an auxiliary sensor(s). The industrial machine of FIG. 1 implementing system 10 is schematically shown as a form-fill-seal machine or machine 12. Although machine 12 is represented here as a form-fill-seal machine, which may be suitable for packing, for example, foodstuff or other products within flexible packing, semi-rigid packaging, zipper packaging, vacuum skin packaging, it is understood that system 10 may be implemented in any of a variety of machines that require calibration to define, for example, various start positions or other positions at various times during use.

Still referring to FIG. 1, a form-fill-seal machine such as machine 12 can perform all of package forming, package filling, and packages sealing tasks with the single machine 12. Examples of form-fill-seal-type packaging machines 12 include those shown in U.S. Pat. No. 7,934,362, which is incorporated herein in full by reference, such as those available from CP Packaging, LLC of Neenah, WI, as the Visionpak® series form-fill-seal machines. Various subsystems and components suitable for implementation in form-fill-seal machine 12 include, for example, the lift mechanism(s) shown in U.S. Pat. No. 10,961,093, which is incorporated herein in full by reference and is also available from CP Packaging, LLC.

Still referring to FIG. 1, machine 12 typically includes multiple operational stations. Supply station 14 is arranged at an upstream or entry end of machine 12 and supports a web of flexible material 16 that is stored as a supply roll 18. Material 16 advances to a web processing station(s), such as forming station 20, to provide a lower web of material 16 as a component of packages that are produced by machine 10. At forming station 20, a die lift system 22 and a plug lowering system 24 provide vacuum evacuation as well as coordinated actions of lifting and lowering cooperative tooling that acts on the lower web of material 16 to create cavities or pockets within which product(s) can be received and define a pocketed web.

Still referring to FIG. 1, after the cavities or pockets are formed into the lower web of material 16, the pocketed web is advanced in a downstream direction through machine 12, toward product filling station 26. This may be achieved by way of, for example, a belt driven clamping arrangement that selectively grips and releases the edges of the pocketed web to incrementally advance it, or other conveying system. At product filling station 26, the product(s) is introduced into the cavities or pockets of the pocketed web as a filled pocketed web.

Still referring to FIG. 1, the filled pocketed web is advanced in a downstream direction through machine 12, toward sealing station 28, similar to the advancement from the forming station 20 to the product filling station 26. Another web of flexible material 30 is stored as a supply roll 32 at sealing station 28 and provides an upper web of material 30 as an additional component of packages that are produced by machine 12. At sealing station 28, a seal lift system 34 is arranged to lift and lower a sealing anvil against a sealing head to form a seal that joins the filled pocketed web and the upper web to each other and provide a connected matrix of sealed packages.

Still referring to FIG. 1, the connected matrix of sealed packages is advanced in a downstream direction through machine 12, toward package separating station 36, similar to the advancement from the forming station 20 to the product filling station 26 and from the product filling station to the sealing station 28. At package separating station 36, a package separating system 38 is arranged to lift and lower a cutting die that severs the material around the perimeters of the cavities or pockets of the packages to create individual packages from the connected matrix of sealed packages. The remaining material 40 that is cut away from the packages is wound onto a collection roll 42.

Still referring to FIG. 1, control system 44 is configured to control the operation of machine 12, including components and subsystems within the supply station 14, forming station 20, product filling station 26, sealing station 28, and separating station 36. Examples include controlling various actuators and other electromechanical devices at each of the stations in order to perform the corresponding procedural operation(s). Control system 20 typically includes a computer which may be an industrial computer or, for example, a PLC (programmable logic controller), along with corresponding software and suitable memory for storing such software and hardware including interconnecting conductors for power and signal transmission at the or between the supply station 14, forming station 20, product filling station 26, sealing station 28, and separating station 36. The computer of control system 20 executes various stored programs which includes routines and/or control methodologies to control the machine's 12 operation during its typical use in a machine use session and also during setup procedures during a machine calibration session(s), including receiving inputs from and sending commands to various actuators and other components within and between supply station 14, forming station 20, product filling station 26, sealing station 28, and separating station 36. Typically, during a calibration session and as explained in greater detail elsewhere, control system 44 evaluates at least one performance characteristic of an actuator, for example, by way of motor feedback without auxiliary sensors, to indirectly infer positional information about a component(s) and then use such information to define other positional information, such as a start or initial position for a moveable component in order to calibrate the arrangement.

Figure 2:
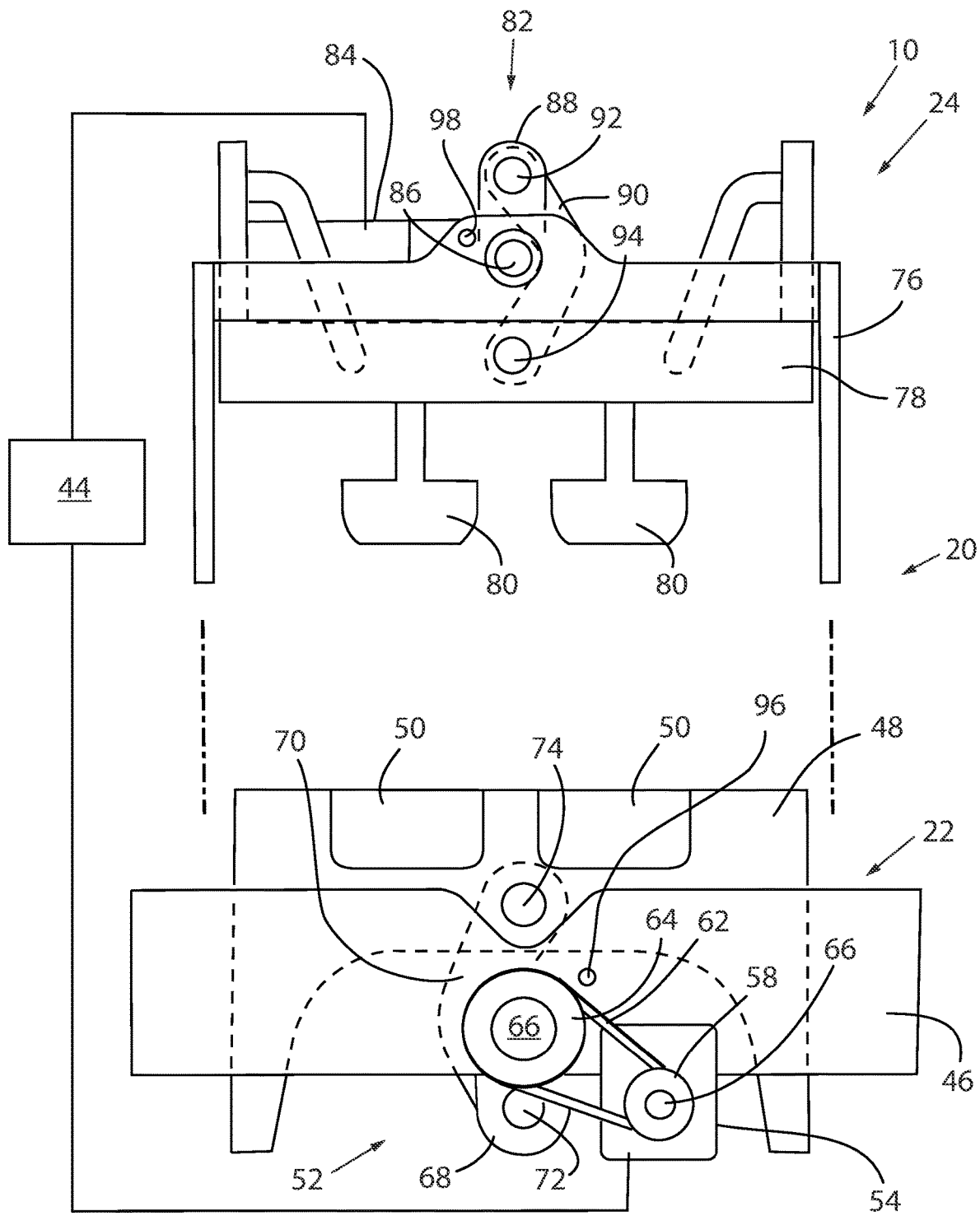
FIG. 2 is a schematic front elevation of various components of a forming station of the machine of FIG. 1 in a retracted state.
Figure 3:
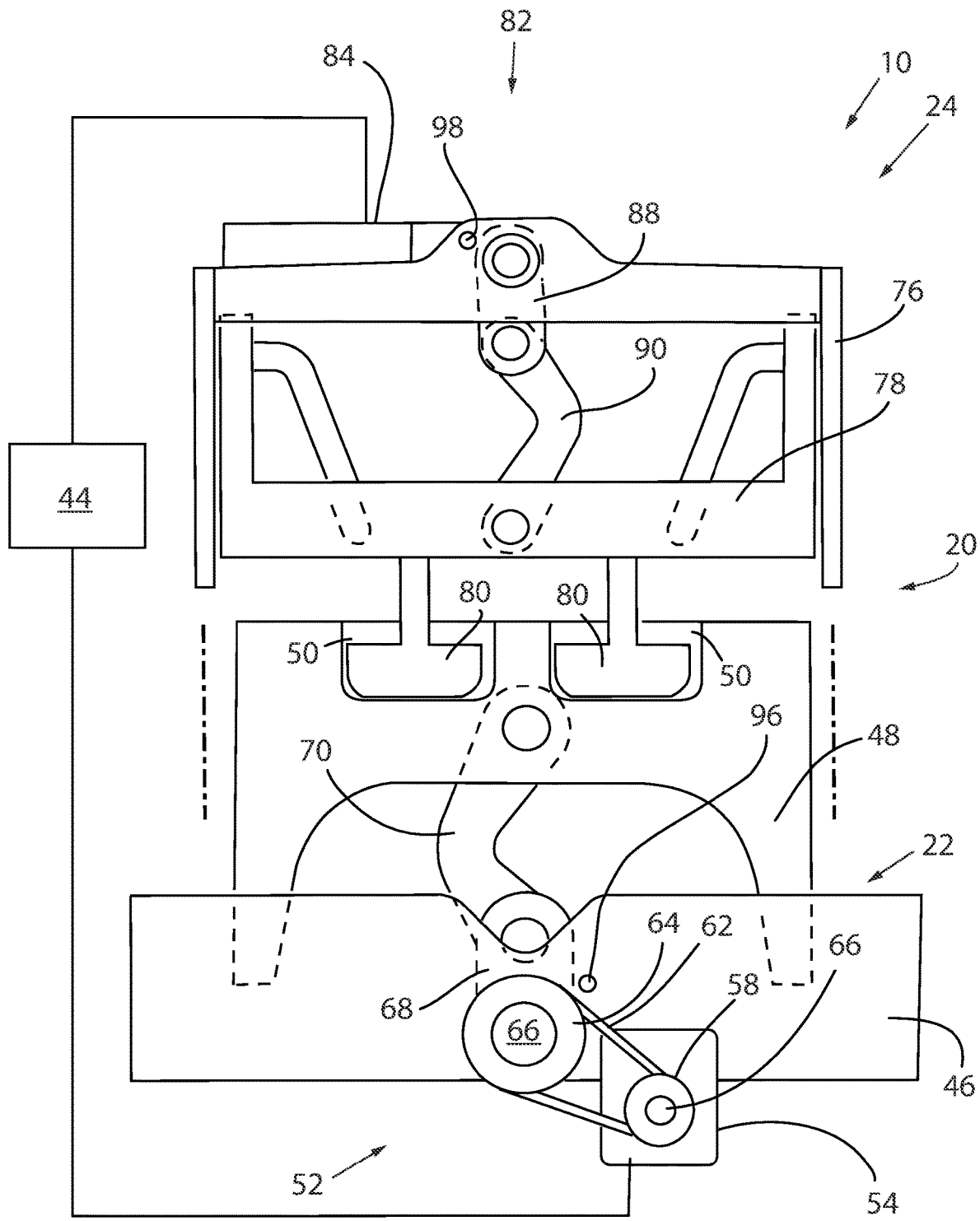
FIG. 3 is a schematic front elevation of various components of the forming station of FIG. 2 in an extended state.

Referring generally to FIGS. 2-3, system 10 is shown implemented for calibrating a repetitively moveable machine component(s) within the die lift system 22 and the plug lowering system 24 at forming station 20. Each of the die lift system 22 and plug lowering system 24 provides a component arrangement that converts rotation of a prime mover or actuator to reciprocating linear movement of a driven component(s) and the system 10 is configured to calibrate and define an initial position of a component(s) for use as a starting point during an operational routine of a machine use session. It is understood that system 10 may additionally or instead be implemented to calibrate other moveable components of machine 12, including various reciprocating, rotating, and/or otherwise moveable components of, for example, various moveable components at the product filling station 26 (FIG. 1), sealing station 28, package separating station 36, or other moveable components within machine 12 or on another machine.

FIG. 2 shows the die lift system 22 and plug lowering system 24 are at a withdrawal phase of an operational routine of a machine use session, in which the lower web of material 16 (FIG. 1) can be advanced downstream along machine 12 (FIG. 1). Die lift system 22 includes a lift mechanism that has a stationary frame or base 46 that is supported by a frame of the machine 12. Base 46 may support a vacuum box (not shown) and a die holder 48 in which dies 50 can be mounted. The die holder 48 is configured to linearly reciprocate relative to base 46. The movement of die holder 48 is constrained by guide tracks that may be implemented as linear bearings or the like, typically arranged as interconnecting vertical components between all four corners of the die holder 48 and corresponding corners of the base 46. A link assembly 52 connects the die holder 48 to an actuator 54. Actuator 54 is typically implemented as a servo drive system or servomotor and includes an electric motor as a prime mover, a gearbox or other transmission assembly, a position sensing device(s), and a control circuit which may be arranged in the servo drive system, which is communicatively connected to control system 44 or may be partially or entirely integrated into the control system 44. Although actuator 54 is represented as having a rotational drive configuration or as a rotary actuator, it is understood that the actuator 54 may implemented as a linear or other actuator. A belt drive system 56 transmits power from the actuator 54 to the link assembly 52. Belt drive system 56 includes a drive pulley 58 that is mounted to an output shaft 60 of the actuator 54 or its gearbox. A belt 62 connects the drive pulley to a driven pulley 64 that is arranged at an end of a shaft 66 that is mounted for rotation to base 46. Link assembly 52 interconnects the belt drive system 56 to the die holder 48 and is configured to convert the rotary motion of actuator 54 and belt drive system 56 into linear motion of the die holder 48. Link assembly 52 has an inner link 68 and an outer link 70 that are connected to each other through rotatable or pivot joints. An inner end of inner link 68 is spline-connected, key-connected, or otherwise locked into rotational unison with shaft 66. An outer end of inner link 68 is pivot connected to a lower end of outer link 70 by way of, for example, a bearing connection that is shown with a pivot pin 72. An upper end of outer link 70 is pivot connected to an intermediate segment of die holder 48, also by way of a bearing connection or the like, which is shown with a pivot pin 74.

Still referring to FIG. 2, plug lowering system 24 includes a lowering mechanism that has a stationary frame or base 76 that is supported by a frame of the machine 12. Base 76 may support plug holder 78 to which plugs 80 can be mounted. The plug holder 78 is configured to linearly reciprocate relative to base 76. Similar die holder 48, the movement of plug holder 78 is constrained by guide tracks, such as linear bearings or the like, arranged between and interconnecting corresponding corners of the die holder 78 and base 76. Link assembly 82 connects the die holder 78 to an actuator 84 and is configured to convert the actuator's rotational movement into linear movement of die holder 48. Like actuator 54, actuator 84 is also typically implemented as a servo drive system or servomotor, similar to actuator 54, that communicatively connected to control system 44. The actuator's gearbox may be a 90-degree gearbox that arranges the actuator's gearbox output shaft perpendicularly with respect to an axis of rotation of the actuator's motor. Instead of an intermediate belt drive system like belt drive system 56 of die lift system 22, actuator 84 is shown in a direct drive relationship with its driven components, such as link assembly 82. Output shaft 86 of actuator 84, for example, the output shaft of its motor or gearbox, provides direct driving power to move the components of plug lowering system 24. Link assembly 82 includes an inner link 88 and an outer link 90 that are connected to each other through rotatable or pivot joints. An inner end of inner link 88 is spline-connected, key-connected, or otherwise locked into rotational unison with shaft 86. An outer end of inner link 88 is pivot connected to an upper end of outer link 90 by way of, for example, a bearing connection that is shown with a pivot pin 92. A lower end of outer link 90 is pivot connected to an intermediate segment of plug holder 78, also by way of a bearing connection or the like, which is shown with a pivot pin 94.

Still referring to FIG. 2, system 10 further includes a mechanical stop(s) that can be used to influence performance characteristics of components that are monitored by control system 44 for calibrating moveable components. Mechanical stops 96, 98 are respectively arranged in die lift system 22 and plug lowering system 24. The mechanical stops shown as stops 96, 98 are typically implemented as rigid pins mounted to the stationary bases 46, 76 of die lift system 22 and plug lowering system 24. Besides pin, the stops may be implemented as other fasteners, hardware, or projecting members or structures that are able to interact with moveable components, typically for force such component to abruptly halt in order to create a change in an actuator's performance characteristic(s). Stops 96, 98 may be mounted to remain in-place during the operational use session of machine 12 or may be temporarily installed to only be in-place during a calibration session of machine 12.

Referring now to FIG. 3, the die lift system 22 and the plug lowering system 24 are shown at inserted or extended positions of an operational routine of a machine use session, in which the lower web of material 16 (FIG. 1) can be stretched to form the cavities or pockets. In the extended positions, the plugs 80 insert at least partially into the void spaces of dies 50 to assist vacuum pressure intruded into the dies 50 to stretch or otherwise draw portion of the lower web of material 16 (FIG. 1) to create cavities or pockets in it and define the pocketed web. Referring again to FIGS. 2-3, the stops 96, 98 are arranged to respectively interact with inner links 68, 88 as moveable components during the calibration session. In die lift system 22, the stop 96 is arranged to be engaged by inner link 68 at a position that is proximate to the extended or raised position as shown in FIG. 3. In plug lowering system 24, the stop 98 is arranged to be engaged by inner link 88 at a position that is proximate to the retracted or raised position as shown in FIG. 2.

Referring generally to FIGS. 4-8, an example of a moveable component that interacts with a stop is shown here as the inner link 88 of the plug lowering system's link assembly 82 and its relationship to the stop 98. Although described with respect to inner link 88 and stop 98, it is understood that the same concepts and interactions apply to other moveable components and stops, such as the die lift system's link assembly 52 and its relationship to the stop 96 and/or other interacting moveable components and stops that can force changes in operational performance characteristics of a corresponding driving actuator.

Figure 4:
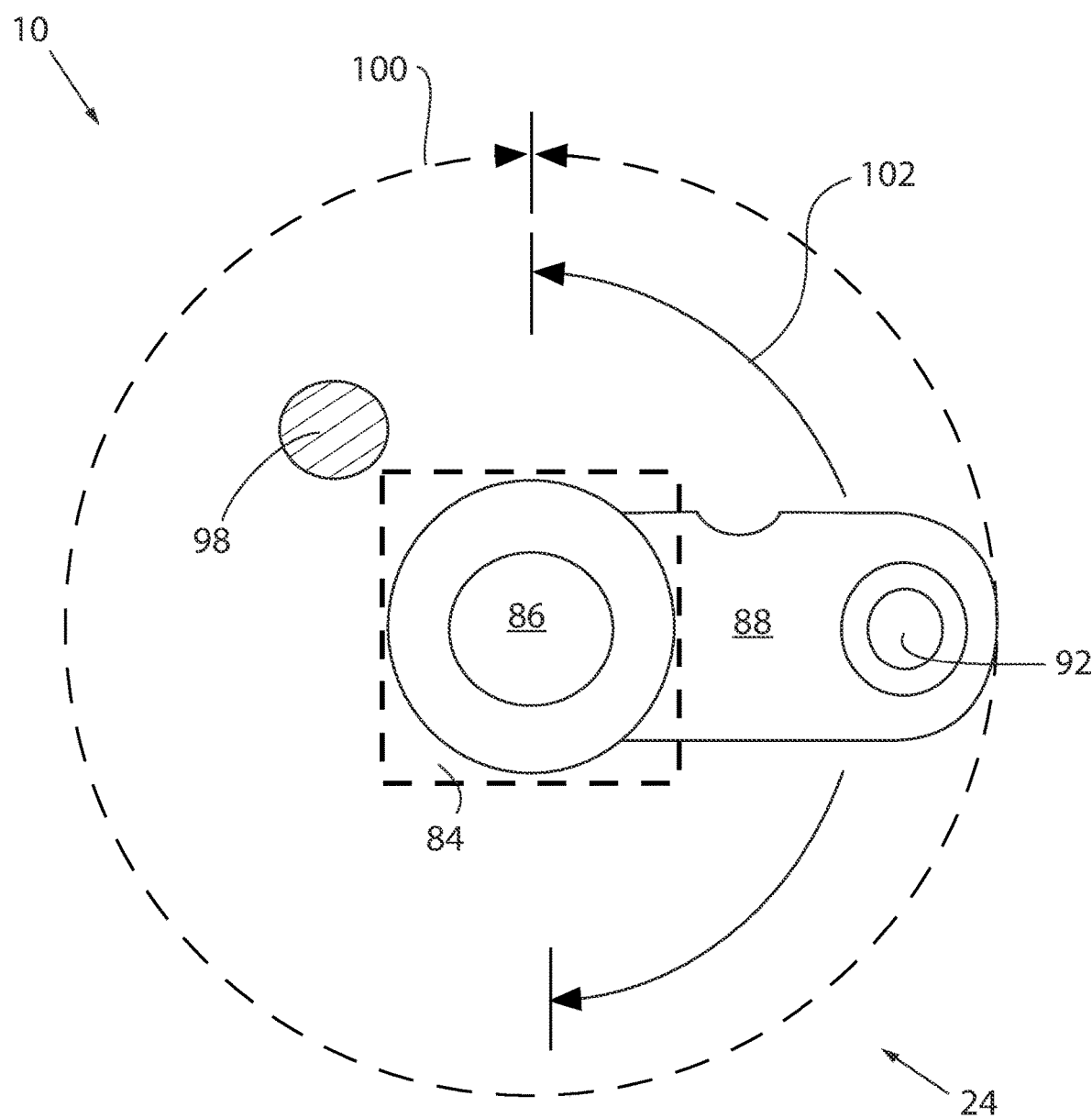
FIG. 4 is a schematic front elevation of various components of a plug lowering system of the forming station of FIG. 2.

Referring now to FIG. 4, without an implementation of the stop 98, inner link 88 can rotate fully 360-degrees about an axis of rotation of the actuator's output shaft 86. This provides an infinite or circular travel path, represented by the dashed-line circle as travel path 100. Although inner link 88 can fully rotate through travel path 100, during a machine use session, its operational range is typically limited according to a stored control program, based on the particular movement(s) needed to perform the corresponding operational routine. An exemplary operational range of inner link 88 is represented by the solid-line arcs as operational range 102. Stop 98 is arranged at a location that is within the travel path 100, but outside of the operational range 102. This arrangement allows the system 10 to influence and recognize aspects of a monitored performance characteristic of the actuator 84 to facilitate the calibration of the plug lowering system 24.

Figure 5:
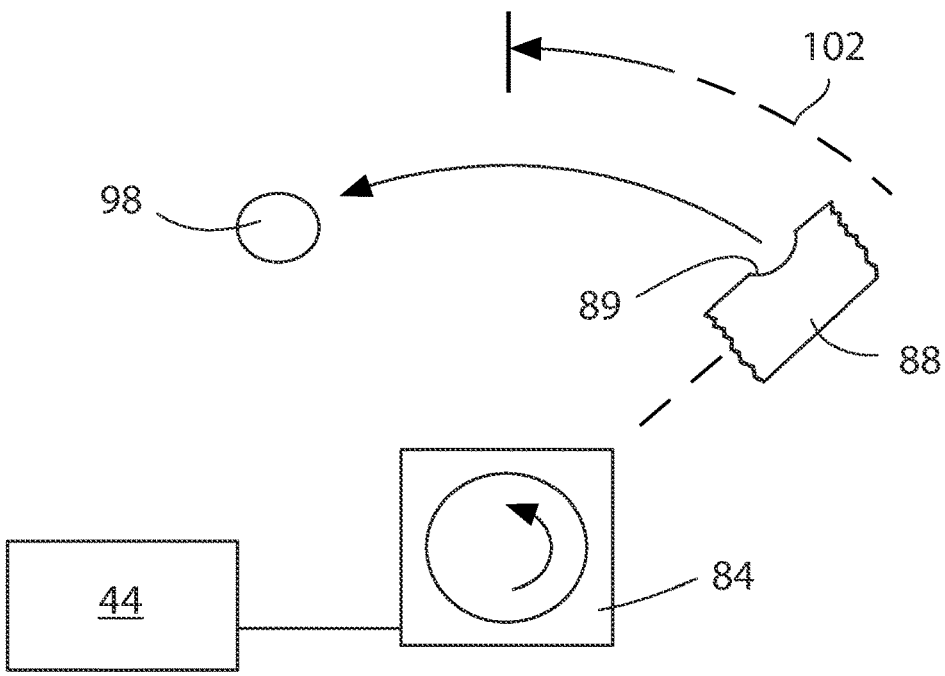
FIGS. 5-8 show a schematic sequence of various component movements that occur during a calibration session.
Figure 6:
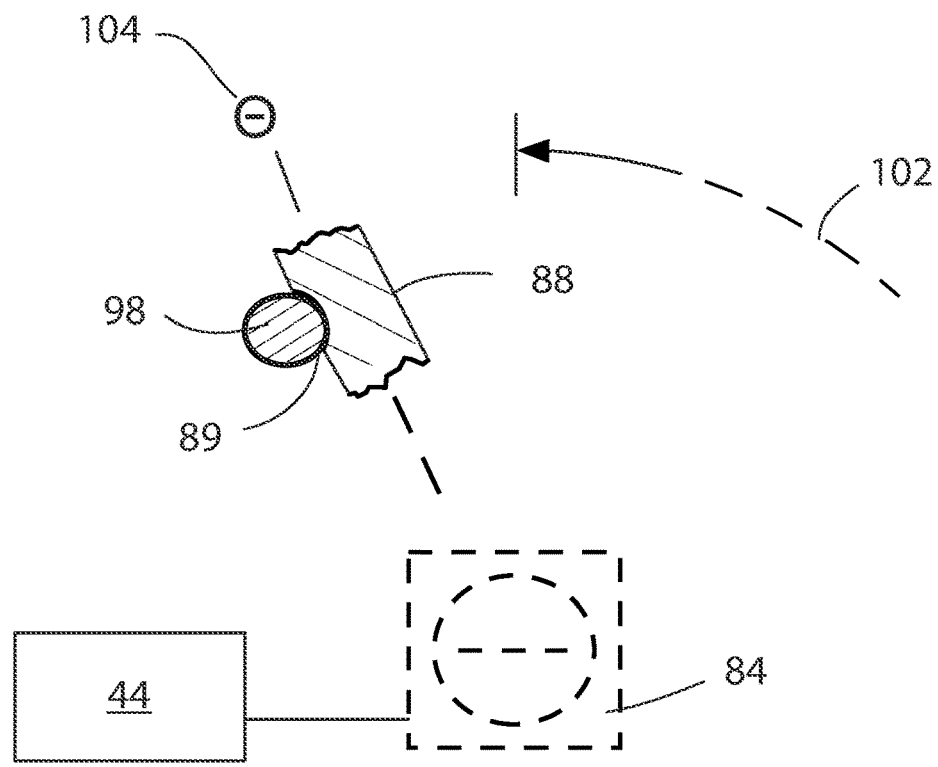
Figure 7:
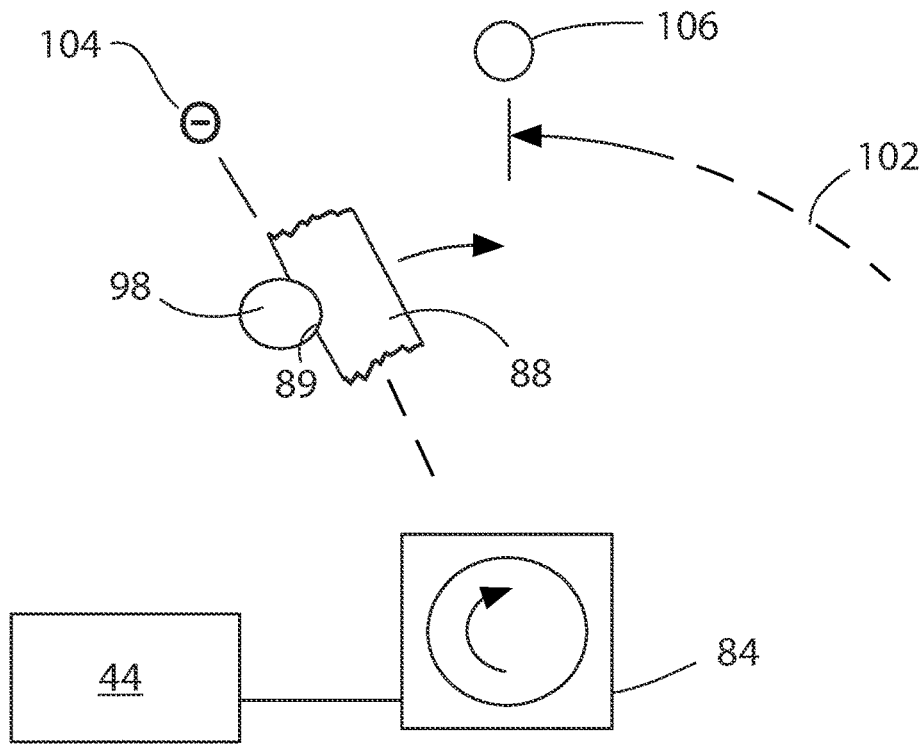
Figure 8:
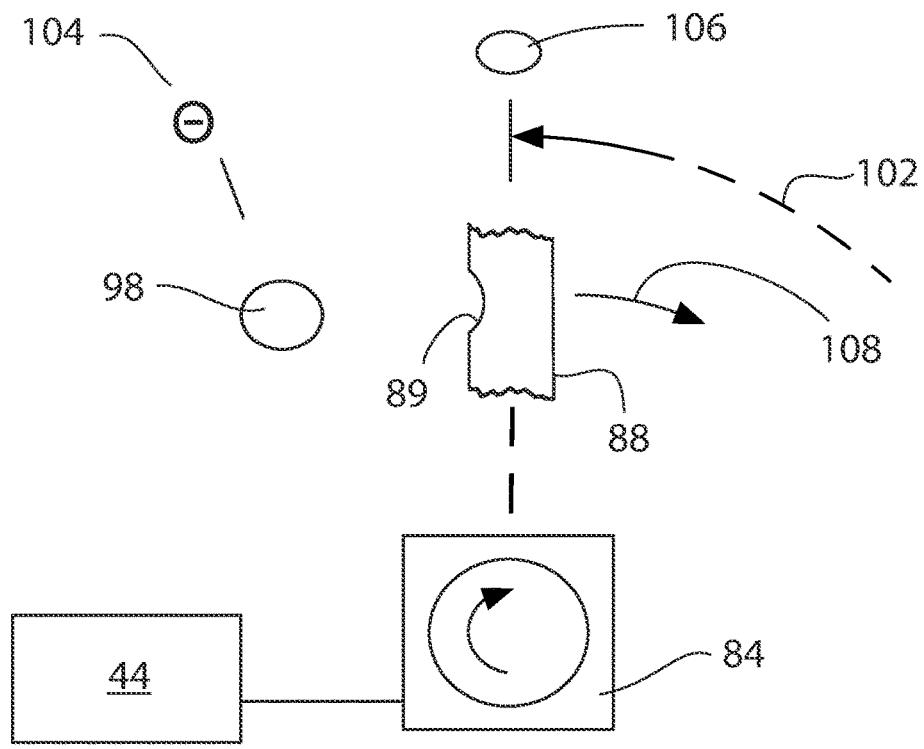

Referring generally to FIGS. 5-7, various phases of a calibration session are represented. During the calibration session, the actuator 84 can operated in a calibration mode, which limits its performance characteristics. The calibration mode of actuator 84 typically reduces its torque output and/or reduces its operational speed. FIGS. 5 and 6 generally represent a reference position seeking phase of a calibration session. FIGS. 7 and 8 generally represent an initial operational position seeking phase of the calibration session. FIG. 8 also generally represents an operational routine confirmation phase of the calibration session.

Referring now to FIG. 5, control system 44 energizes the actuator 84 and commands it to infinitely drive in a single direction while evaluating the actuator's performance characteristics, which rotates inner link 88 outside of the operational range 102, upstream of an operational initial position. In FIG. 6, a triggering event is represented at impact or when the inner link 88 engages stop 98 as represented by the cross-hatched lines of inner link 88 and stop 98. The engagement of inner link 88 and stop 98 changes the performance characteristic value(s) of actuator 84. As represented by the dashed-form of actuator 84 in FIG. 6, at the triggering event, the abrupt stopping of the inner link's travel stalls the motor of actuator 84, resulting in a substantial, for example, a step-change-type increase in torque value or a decrease in rotational speed of its output shaft 86 (FIG. 4). The control system may evaluate the anomalous event and determine whether it is a triggering event by, for example, comparing the observed values to minimum or threshold values. Such comparison may be done by way of discrete values, ranges, or through comparisons of monitored or observed torque information values to those of reference torque curves. The inner link 88 may include a recess 89 at a link surface that is aligned to receive the stop in a nesting manner during the engagement of the triggering event to distribute the forces of impact over a substantially larger surface area when compared to a more concentrated point-loading-type force transfer than would otherwise occur between a curved and flat surface. Regardless, control system 44 recognizes this triggering event and assigns or defines a stop engagement position or a null point 104 that corresponds to the position of inner link 88 at that time. Referring now to FIG. 7, after defining the null point 104, control system 44 uses the null point 104 as a reference point to define a resultant point or zero point 106 that corresponds to the operational initial position. Control system 44 commands the actuator 84 to move the inner link 88 from the null point 104 to the zero point 106 between FIGS. 7 and 8. When the inner link 88 is at the zero point 106, control system 44 typically commands the actuator 84 to drive the inner link 88 along a confirmation movement path, represented by the solid arrow as path 108. The confirmation movement path 108 is the same as an operational movement path that is performed during the machine use session, within the operational range 102. Upon successful completion of movement through the confirmation movement path 108, control system 44 commits or sets the previously assumed initial position of the zero point 106 to a defined, calibrated, initial position for use as the component's starting point during the machine use session. Here as well, the evaluation(s) can be made by comparisons to store threshold values and/or to confirmation phase torque values to values of reference torque curves for evaluating the acceptability of the component's movement(s).

Figure 9:
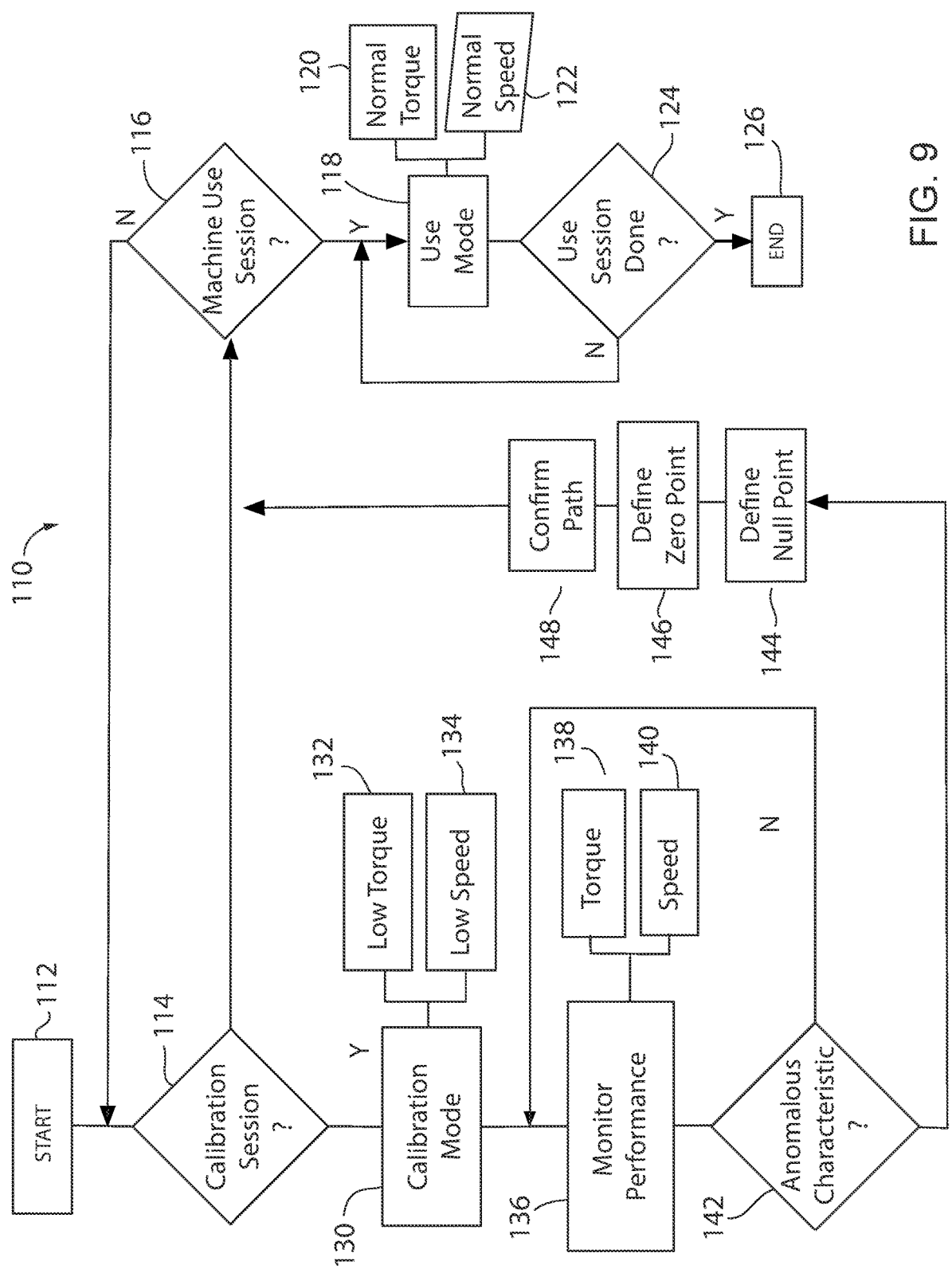
FIG. 9 is a flowchart showing an exemplary procedure of calibration and use sessions of a machine.

Referring now to FIG. 9 and with background reference to FIGS. 1-4, the flowchart represents an implementation of system 10 for automatically calibrating a moveable component of machine 12 as method or process 110, which starts at block 112. At decision block 114, the control system 44 determines whether a calibration session has been requested by a user, typically through an HMI (human machine interface), such as a touchpad control screen or the like. It is understood that the calibration session may be automatically implemented, for example, if the control system 44 determines that a condition of machine 12 exists that requires (re)calibration, such as the removal/replacement of an actuator or reconfiguration of a component or subsystem. Regardless, if no request for a calibration session was made, then at decision block 116, the control system 44 determines whether a machine use session is or should be undertaken. If a machine use session should occur, then the machine 12 continues in a normal use mode to perform its operational routine(s) while operating its actuators and other components at normal torque and speed values, as respectively represented at blocks 118, 120, and 122. At decision block 124, until the machine use session is complete, the machine 12 continues to operate in the normal use mode and, when the session is complete, then the session ends at block 126.

Still referring to FIG. 9, at decision block 114, if a calibration session was requested, then control system places the actuator(s) or other components in a calibration mode at block 130. As represented at blocks 132, 134, a calibration mode for actuators 54, 84 typically indicates restricting their operation to low torque and/or low speed values. While operating in calibration mode, control system 44 monitors the performance characteristics of the actuators at block 136, to evaluate their performance characteristic values, including torque and speed values at blocks 138, 140 for anomalous values which may be indicative of a triggering event, represented at decision block 142. Typically, the control system 44 will command the actuator(s) 54, 74 to infinitely drive in a single direction, moving a moveable component such as an inner link 68, 88 toward a stop 96, 98. When the inner link 68, 88 collides with stop 96, 98, the actuator 54, 84 stalls, providing the triggering event as an anomalous performance characteristic value such as a near instantaneous torque rise or speed drop. When this occurs, at block 144, control system 44 defines a null point that corresponds to the location of the inner link 68, 88 at that time. The null point defines a stop engagement point as a reference position from which control system determines a zero point as a function of, for example, a known angular or linear distance from the null point, as represented at block 146. At block 148, control system 44 commands the actuator 54, 84 to drive movement through a confirmation movement path as a low torque and low speed test run of the operational movement path. If the confirmation movement path is successful, then the machine use session can proceed at block 116.

Many changes and modifications could be made to the invention without departing from the spirit thereof. The scope of these changes will become apparent from the appended claims.

What is claimed is:

1. A system for automatic calibration of an initial position of a moveable machine component of an industrial machine, the system comprising:
   a movable machine component that defines an initial position, wherein the moveable machine component moves away from the initial position during a machine use session;
   an actuator configured to drive the movable machine component;
   a control system that is communicatively connected to the actuator for controlling the actuator, wherein the control system is configured to:
      command the actuator to drive the movable machine component according to a use movement routine during the machine use session;
      command the actuator to drive the movable machine component according to a calibration-movement routine during a machine calibration session, wherein during the machine calibration session, the actuator drives the moveable machine component until the control system detects a triggering event that corresponds to an anomalous performance characteristic value;
      evaluate a performance characteristic of the actuator during the machine calibration session;
      define the initial position based on the evaluation of the performance characteristic of the actuator.

2. The system of claim 1, wherein the anomalous performance characteristic value corresponds to a detected change in at least one of a torque value and a speed value of the actuator.

3. The system of claim 2, wherein the control system defines a null point that corresponds to a position of the moveable machine component when the control system detects the triggering event.

4. The system of claim 3, wherein during the machine calibration session, the actuator drives the movable machine component with at least one of a lower torque value and a slower speed value than during the machine use session and the triggering event corresponds to a stall condition of the actuator.

5. The system of claim 3, wherein the control system is configured to define a zero point that corresponds to the initial position and is spaced from the null point.

6. The system of claim 3, wherein:
   the moveable machine component defines an operational range during the machine use session; and
   the null point is arranged outside of the operational range and upstream of the zero point.

7. The system of claim 6, wherein:
   the moveable machine component is moveable along a travel path that extends beyond the operational range;
   a stop is arranged at a location that is within the travel path and outside of the operational range of the moveable machine;
   during the machine calibration session, the actuator drives the movable machine component to engage the stop; and
   the engagement of the moveable machine component with the stop provides the triggering event.

8. An industrial machine, comprising:
   a frame supporting an operational station for performing an operational task on a workpiece during a machine use session;
   a moveable machine component arranged at the operational station for performing the operational task;
   an actuator that is configured to drive movement of the moveable machine component;
   a control system that controls the actuator and is configured to:
      drive movement of the moveable machine component according to a use-movement routine for performing the operational task during the machine use session, wherein an initial position is defined by a position of the moveable machine component at a start of the use-movement routine;
      drive movement of the moveable machine component according to a calibration-movement routine during a machine calibration session; and
      monitor a performance characteristic of the actuator during the machine calibration session;
      identify a triggering event that corresponds to an anomalous performance characteristic value;
      determine the initial position based on the triggering event.

9. The industrial machine of claim 8, wherein the anomalous performance characteristic value corresponds to a torque rise event that is defined by an actuator torque value that is greater than a threshold torque value.

10. The industrial machine of claim 9, further comprising a stop arranged at the operational station and wherein during the machine calibration session:
    the actuator drives the movable machine component to engage the stop and stall the actuator; and
    the torque rise event corresponds to the stalling of the actuator.

11. The industrial machine of claim 8, wherein the control system is configured to:
    define a null point that corresponds to a position of the moveable machine component when the control system detects the torque rise event; and
    define a zero point that corresponds to the initial position and is spaced from the null point.

12. The industrial machine of claim 11, wherein the moveable machine component is a link of a link assembly that converts a rotary motion of the actuator into a linear motion.

13. The industrial machine of claim 12, wherein the link is arranged within a die lift system.

14. The industrial machine of claim 12, wherein the link is arranged within a plug lowering system.

15. A method for automatically calibrating an initial position of a moveable machine component of an industrial machine, the method comprising:
    operating an actuator in a calibration mode during a calibration session, wherein the actuator in the calibration mode defines at least one of:
       a reduced speed value compared to an operational speed value; and a reduced torque value compared to an operational torque value;

driving a moveable machine component with the actuator operating in the calibration mode;

monitoring a performance characteristic of the actuator while operating in the calibration mode;

detecting a triggering event that corresponds to an anomalous performance characteristic value;

defining an initial operational position of the moveable machine component as a function of a position of the moveable machine component during the detection of the triggering event.

16. The method of claim 15, further comprising:

driving the moveable machine component with the actuator while operating in the calibration mode until the moveable machine component contacts and is stopped by a stop;

detecting a torque rise as the triggering event when the movable machine component contacts and is stopped by the stop;

defining a null point that corresponds to a position of the moveable machine component when the control system detects the torque rise;

defining a zero point that corresponds to the initial operational position and is spaced from the null point.

17. The method of claim 16, further comprising:

driving the moveable machine component with the actuator while operating in the calibration mode to travel along a confirmation movement path that is the same as an operational movement path;

upon completion of the confirmation movement path without recognition of a fault condition, committing the zero point as the initial position for use as a starting point from which the moveable machine component moves during a subsequent machine use session.

* * * * *